United States Patent
Khan et al.

(10) Patent No.: US 10,138,633 B2
(45) Date of Patent: Nov. 27, 2018

(54) SELF-ADHERING UNDERLAYMENT SHEETS TO FORM WATERPROOFING JOINTS, RELATED BUILDING ASSEMBLIES AND METHODS

(71) Applicant: Gardner-Gibson, Inc., Tampa, FL (US)

(72) Inventors: Amir G. Khan, Valrico, FL (US); Alan R. Clites, Plant City, FL (US); Robert M. Hyer, Torrance, CA (US)

(73) Assignee: Gardner-Gibson, Inc., Tampa, FL (US)

( * ) Notice: Subject to any disclaimer, the term of this patent is extended or adjusted under 35 U.S.C. 154(b) by 151 days.

(21) Appl. No.: 14/924,491

(22) Filed: Oct. 27, 2015

(65) Prior Publication Data

US 2017/0114542 A1      Apr. 27, 2017

(51) Int. Cl.
*B32B 3/10* (2006.01)
*E04D 5/10* (2006.01)
(Continued)

(52) U.S. Cl.
CPC ................................... *E04D 5/10* (2013.01);
*C09J 7/20* (2018.01); *C09J 11/04* (2013.01);
*E04B 1/625* (2013.01); *E04B 1/6803*
(2013.01); *E04D 5/148* (2013.01); *E04D 12/00* (2013.01); *C09J 2400/10* (2013.01);
*C09J 2417/00* (2013.01);
(Continued)

(58) Field of Classification Search
None
See application file for complete search history.

(56) References Cited

U.S. PATENT DOCUMENTS 6,134,856 A    10/2000 Khan et al.
2007/0068109 A1    3/2007 Swann
(Continued)

OTHER PUBLICATIONS

Shingle Underlayments and Flintlastic SA Roof Systems https://web.archive.org/web/20090824063156/https://www.certainteed.com/resources/UnderlaymentInstall.pdf published Aug. 24, 2009 and retrieved on Jun. 12, 2017.*
(Continued)

*Primary Examiner* — Christopher Polley
(74) *Attorney, Agent, or Firm* — Flaster/Greenberg, PC (57) ABSTRACT

As described herein, the invention includes a building underlayment sheet that comprises an underlayment lamina having a top surface and a bottom surface. The bottom surface includes an interior portion and a selvage portion that extends from the interior portion of the bottom surface to a terminal distal edge of the sheet and the interior portion of the bottom surface bears a self adhesive layer. The selvage portion of the bottom surface bears a bonding composition that is capable of bonding to a top surface of a second underlayment lamina to form a full lap joint. In some embodiments, the self adhesive layer includes an asphalt, a polymer such as poly(styrene-butadiene-styrene)(SBS), and a tackifier, and/or the bonding composition includes asphalt, a polymer such as poly(styrene-butadiene-styrene), ground tire rubber (GTR), and tackifier. Also included are building assemblies that include the application of one or more of the underlayment sheets to a building surface, such as a roof surface and methods of installing the underlayment and waterproofing a roof surface.

26 Claims, 5 Drawing Sheets

(51) Int. Cl.
  *C09J 11/04* (2006.01)
  *E04B 1/62* (2006.01)
  *E04B 1/68* (2006.01)
  *E04D 5/14* (2006.01)
  *E04D 12/00* (2006.01)
  *C09J 7/20* (2018.01)

(52) U.S. Cl.
  CPC ...... *C09J 2421/00* (2013.01); *C09J 2423/005* (2013.01); *C09J 2425/00* (2013.01); *C09J 2453/00* (2013.01); *C09J 2467/006* (2013.01); *C09J 2495/00* (2013.01)

(56) References Cited

U.S. PATENT DOCUMENTS

2007/0281119 A1* 12/2007 Di Stefano ........... E04D 12/002
 428/40.1
2009/0105376 A1* 4/2009 Korenstra ............. C08F 297/04
 524/68
2010/0196648 A1* 8/2010 Samanta ................ B32B 7/12
 428/40.3

OTHER PUBLICATIONS

International Search Report and Written Opinion in corresponding PCT Application No. PCT/US16/58914 dated Jan. 17, 2017 (18 pages).

* cited by examiner

SELF-ADHERING UNDERLAYMENT SHEETS TO FORM WATERPROOFING JOINTS, RELATED BUILDING ASSEMBLIES AND METHODS

BACKGROUND OF THE INVENTION

In the process of building construction, the building surfaces, including walls and roots, are commonly covered in some type of membrane, barrier or building wrap before the final exterior surface, for example, shingles, siding or stucco, is applied. The building barrier or wrap serves to protect the structure of the house from the weather, especially moisture which may seep past the final exterior surface, e.g., the shingles or siding.

Conventionally, roofing barriers ("underlayments", so called as they 'underlay' the final roof treatment of, e.g., shingle or tile) are applied to the surface of the roof (usually plywood) using a separately applied adhesive. In conventional practice, the underlayments are supplied to the builder in rolls. To install, installers employ a two step process. First, a layer of uncured or wet adhesive is manually applied to the roof surface by the installer with a roller, brush or mop-like tool. Subsequently, the underlayment is unrolled and applied over the adhesive layer; pressure and/or heat may be subsequently applied to ensure drying/curing of the adhesive and adherence of the underlayment to the roof surface.

In addition, because most roofs have a greater surface area than the underlayment sheet, more than one sheet is required to cover a roof. In conventional practice, to ensure that the seams between the adjacent sheets are waterproof, the ends of the sheets are overlapped by spreading an adhesive along the outer edge of the first sheet, and overlying the edge of the second sheet onto the adhesive coated portion of the first sheet. Alternatively (or additionally), the seams are taped with specially devised asphalt-containing roof seam tapes.

This method suffers from several drawbacks. The first two steps must be carried out in rapid succession so the adhesive does not cure or dry before the underlayment is applied. This presents a challenge on sunny, warm or windy days, when the adhesive dries very quickly.

Because the adhesive is manually applied both to the bottom surfaces of the sheets and to the edges, the thickness and/or continuity of adhesive may vary from roof to roof, or even from sheet to sheet on the same roof, resulting in inconsistent performance of the underlayment and variable material costs.

Moreover, the multi step installation process (including the adhering and/or taping of the seams) is time intensive, resulting in greater labor costs as compared to, for example, a one step process, and involve increased time spent on rooftop by installers, which gives rise to an increased chance of injury.

Prior art attempts to alter the structure of the underlayment sheet so that the installation process is streamlined have been attempted, but these attempts have drawbacks.

For example, U.S. Pat. No. 6,924,015 describes a roofing membrane having an upper layer of a specifically defined modified bituminous material and a side lap coated with factory applied adhesive covered with a release film, and a lower layer carrying a self adhesive bituminous material and a release film.

U.S. Pat. Nos. 7,132,143 and 6,696,125 describe a "dual compound", self-adhering underlayment or roof covering wherein the back side bears a specifically defined asphalt containing self-adhesive that adheres to a roof surface; this back side is covered with a release liner which is removed and discarded at installation. The front side has a defined side lap and end lap; the whole of the front side is coated with a polypropylene-based top layer and the lap ends are covered with a release sheet, while the remainder of the front side is covered with a surface agent, such as a stitch bonded fabric.

In each of these described technologies, the installer must remove both the release liner from the back side, and from the front side to expose the adhesives, adding extra steps, risk and inconvenience to the task of installation.

Thus, there remains a need in the art, for an effective roof barrier or underlayment that is simple and quick to install, and yet which maintains high performance standards.

BRIEF SUMMARY OF TOE INVENTION

As described herein, the invention includes a building underlayment sheet that comprises an underlayment lamina having a top surface and a bottom surface. The bottom surface includes an interior portion and a selvage portion that extends from the interior portion of the bottom surface to a terminal distal edge of the sheet and the interior portion of the bottom surface bears a self adhesive layer. In some embodiments, the selvage portion of the bottom surface also bears a self-adhesive layer. The selvage portion of the bottom surface bears a bonding composition that is capable of bonding to a top surface of a second underlayment lamina to form a full lap joint. In those embodiments where the selvage portion of the bottom surface also bears a self-adhesive layer, the bonding composition may be applied over or on top of the self-adhesive layer.

In some embodiments, the self adhesive layer includes an asphalt, a polymer such as a poly(styrene-butadiene-styrene) (SBS), and a tackifier, and/or the bonding composition includes asphalt, a polymer such as poly(styrene-butadiene-styrene), ground tire rubber (GTR), and tackifier. A filler may also be included.

Also included are building assemblies that include the application of one or more of the underlayment sheets to a building surface, such as a roof surface and methods of installing the underlayment and waterproofing a roof surface.

BRIEF DESCRIPTION OF THE SEVERAL VIEWS OF THE DRAWINGS

The foregoing summary, as well as the following detailed description of various embodiments of the invention, will be better understood when read in conjunction with the appended drawings. For the purpose of illustrating the invention, there is shown in the drawings various embodiments. The invention, however, is not limited to the precise arrangements and instrumentalities shown. In the drawings.

DETAILED DESCRIPTION OF THE INVENTION

The invention described herein includes underlayment sheets suitable for application to building surfaces, such as roofs, related building assemblies and methods to install the underlayment sheets to form the building assemblies. The underlayment sheets described herein are simpler to install, as they require no additional adhesives, require removal of only a single release film per surface and allow the installer to form secure lap joints between the sheets that are substantially resistant to rain, snow and ice without application of additional bonding agents. When installed correctly, the time needed to install is significantly less as compared to the conventional methods; consequently labor costs are reduced and workplace safety is potentially increased. Moreover, since both the adhesive and the bonding agent are already present on the underlayment sheet prior to installation, performance consistency of the assemblies is improved.

Include within the scope of the invention is an underlayment sheet that can be applied to a building surface, such as an external wall or roof. Once installed, the underlayment sheet may be covered with any external building component known or developed in the art, such as, for example, tile, shingles, siding, clapboard, brick, stone, wood shakes, stucco, metal panels, built up roofing (BUR), and modified bitumen cap sheets (MB). In an embodiment, the underlayment of the invention is directed to uses as underlayment of roof eaves or valleys, or both, to prevent leakage of, e.g., shingle, tile or metal roofs from water back-up due to weather, including rain and ice dams.

As used herein, the term "polymer" includes copolymers (two or more different monomers copolymerized to one another) as well as large molecules composed of the same monomer polymerized together.

The phrase "substantially resistance to rain, snow and ice", as used herein, means that the joint will meet at least the minimum requirements of "Waterproof Integrity of Side Lap Seam" as set forth in ASTM D1970/D1970—15a, 2015, "Standard Specification for Self-Adhering Polymer Modified Bituminous Sheet material Used as Steep Roofing Underlayment for Ice Dam Protection," ASTM International at ¶ 7.10 (hereinafter "ASTM 1970"), the entire contents of which are incorporated herein by reference.

As used herein, words such as "inner", "outer," "proximal," "distal," "upper," "lower," "interior," "exterior," "right," "left," and words of similar import are used to aid in comprehension of the conjunction with the drawings attached hereto and to have their ordinary meaning when referring to directions in the drawings or relative space. They are not intended to be and are not limiting. Likewise, the invention is described herein in preferred embodiments, but it should be understood from this disclosure that other embodiments are contemplated and within the scope of the appended claims.

The underlayment sheet of the invention includes a lamina having a top surface and a bottom surface. In an embodiment, each of the surfaces is substantially planar and smooth. In some embodiments, at least one of the surfaces is wholly or partially textured. Such texturing may serve, for example, to facilitate adhesion of adhesive(s) or provide reduced slippage/increased friction to increase the installer's safety, as he or she may need to walk across the installed sheet.

The lamina may be made of any material known or developed in the art, that provides reasonable waterproofing properties and a level of moisture vapor permanence. It may be preferred that the material is sufficiently flexible so that the finished underlayment sheets can be rolled for packaging and transport/delivery purposes. It may be preferred that the lamina material is resistant to cracking and tearing, particularly at temperatures of about −10° C. to about 60° C., so that the underlayment sheet less susceptible to damage during the physical manipulations required for its installation.

Although the sheet is adhered to the building surface primarily by a self adhesive layer (described below), in some embodiments it is preferred that the material selected for the lamina exhibits self-sealability around a nail or other mechanical fastener. Such materials for the lamina may be, for example, non-woven materials, woven materials, a saturated felt (e.g., felted glass fibers and/or cellulose fibers), mesh or saturated mesh of thermoplastic or thermoset filaments, a porous ("breathable") material, a non-porous material, and a polymer, such as a thermoplastic olefin. In some embodiments, the lamina may be a polyester or fiberglass sheet or a combination thereof.

The lamina may be any thickness. However, in many embodiments the preferred thickness may be about 1 mm to about 2 mm; in some embodiments 1.5 mm may be preferred. The length and width dimensions may also vary. It may be preferred that the lamina about 10 meters to about 20 meters in length. Independently, the lamina may be about 0.5 meters to 5 meters, preferably about 1 meter, in width. Other length and width dimensions are contemplated, depending on the end application.

With reference to FIGS. 1-5, the underlayment sheet 10 includes a lamina 16 which has a top surface 12 and a bottom surface 14. The lamina 16 includes a terminal distal edge 18. The terminal distal edge 18 may run along one or both of a hypothetical X or Y axis of the sheet (i.e., the edge may be the horizontal edge or the longitudinal edge, or both). A selvage portion 20 extends from the distal edge 18 of the sheet 10 and terminates adjacent to the interior portion 22 of lamina 16.

The selvage portion 20 may extend about 0.3 to about 10 inches from the distal edge 18. It may be preferred that the selvage portion extends from about 1 to about 5 inches or about 3 to about 4 inches from the distal edge 18. Regardless of its dimension, the selvage portion 20 is adjacent to the interior portion 22 of the bottom surface 14 of the sheet 10.

At least one of the selvage portion(s) 22 of the bottom surface 14 is coated with or carries a bonding composition 24 that is capable of bonding to the top surface of a second underlayment sheet 26 to form a full lap joint 28 that is substantially resistant to rain, snow and ice. The bonding composition may be placed on the selvage portion so as to form a continuous layer.

Alternatively, the layer of bonding composition 24 may be discontinuous—such as uniformly or non-uniformly arranged "dots" or "squiggles" of bonding composition placed throughout the selvage portion.

The bonding composition may be any heat or pressure sensitive adhesive known or to be developed in the art. However, it may be preferred that the bonding composition includes:

(i) asphalt, which, in some embodiments, may be present in an amount of about 30% to about 70%, about 40% to about 60%, or about 50% to about 55% by weight of the total composition;

(ii) a polymer which may be, for example, poly (styrene-butadiene), styrene-isoprene-styrene, styrene-ethylene/butylene-styrene or combinations, blends or co-polymers of the same; which, in some embodiments may be present in an amount of about 1% to about 20%, about 5% to about 10% or about 7% to about 15% by weight of the total composition;

(iii) ground rubber tires (GTR) which, in some embodiments may be present in an amount of about 0.05% to about 10%, about 1% to about 4%, or about 3% to about 7% by weight of the total composition, (iv) one or more tackifiers, which, in some embodiments may be present in a total amount of about 9% to about 16% by weight of the total composition and (v) filler or combination of fillers. The fillers may be present in an amount of about 15% to about 25% by weight of the total composition.

Further, the composition may include a tackifying oil. One may wish to include the tackifying oil in an amount of about 0.5 to about 2% by weight of the total composition. Suitable oils can include, without limitation, paraffinic based oils (Kendex 150 m), used process oils such as Safety Kleen and/or used motor oils.

Asphalts for use in the bonding composition may be any in the art. It may be preferred that asphalts having a penetration value of about 120 to about 240 and a softening point of about 30° C. to about 60° C. are used in some applications.

Any GTR may be used. In some embodiments, it may be preferred that the GTR in small to medium mesh (e.g., about 10 to about 500, about 20 to about 500 mesh). The GTR may be produced via ambient or cryogenic milling processes, or a mixture thereof.

The filler may be any known or to be developed in the art. Examples of suitable fillers include, without limitation, limestone, chalk, talc, carbon fibers, carbon black, carbon nanotubes, laponite, silica, ash, china clay, calcium carbonate, smectite and mixtures thereof.

Any tackifiers known or to be developed in the art my be used, including, for example, rosins and their derivatives, terpenes and modified terpenes, aliphatic, cycloaliphatic, and aromatic resins, hydrogenated hydrocarbon resins, and their mixtures, terpene-phenol resins. In an embodiment, the tackifier may include rubbers (natural or synthetic) and a tackifying resin, as well as, for example, low molecular weight hydrocarbon resins, e.g., without limitation, $C_5$ to $C_{20}$ hydrocarbons. An example may be NP25 (from Neville Chemical Company, Pittsburgh, Pa.) or Piccotac™ (from Eastman Chemical Company, Kingsport, Ten.).

The interior portion 22 of the bottom surface 14 of the lamina 16 is coated with or carrier a self adhesive layer 34. The layer may be made of pressure and/or heat sensitive adhesive materials suitable for building applications, as are known or shall be developed in the art. In most instances, it may be preferred that the self adhesive layer is made of an asphalt-containing material and/or exhibits a minimum adhesion to plywood of about 0.92 kgf/30.5 cm at 40° F., and about 5.44 kg/30.5 cm at 75° F., a evaluated by ASTM Test method D903 as modified by ASTM D1970.

In many embodiments it may be preferred that the self adhesive layer 34 is composed specifically of:

i) asphalt, which, in some embodiments, may be present in an amount of about 40% to about 85%, about 50% to about 80%, or about 65% to about 75% by weight of the total composition;

(ii) a polymer which may be, for example, poly (styrene-butadiene), styrene-isoprene-styrene, styrene-ethylene/butylene-styrene or combinations, blends or co-polymers of the same; which, in some embodiments may be present in an amount of about 1% to about 20%, about 5% to about 10% or about 7% to about 15% by weight of the total composition;

(iii) one or more tackifiers, which, in some embodiments may be present in a total amount (i.e., the sum of all tackifiers) of about 0 to about 30%, 5% to about 25%, or about 10% to about 20% by weight of the total composition, and (v) filler or combination of fillers. The fillers may be present in an amount of about 0 to about 35%, or about 5% to about 25%, or about 10 to about 20% by weight of the total composition.

The components (i) to (v) are described in detail above with reference to the bonding composition, and these same details apply to the materials that one may use in the self adhesive layer.

Figure 1:
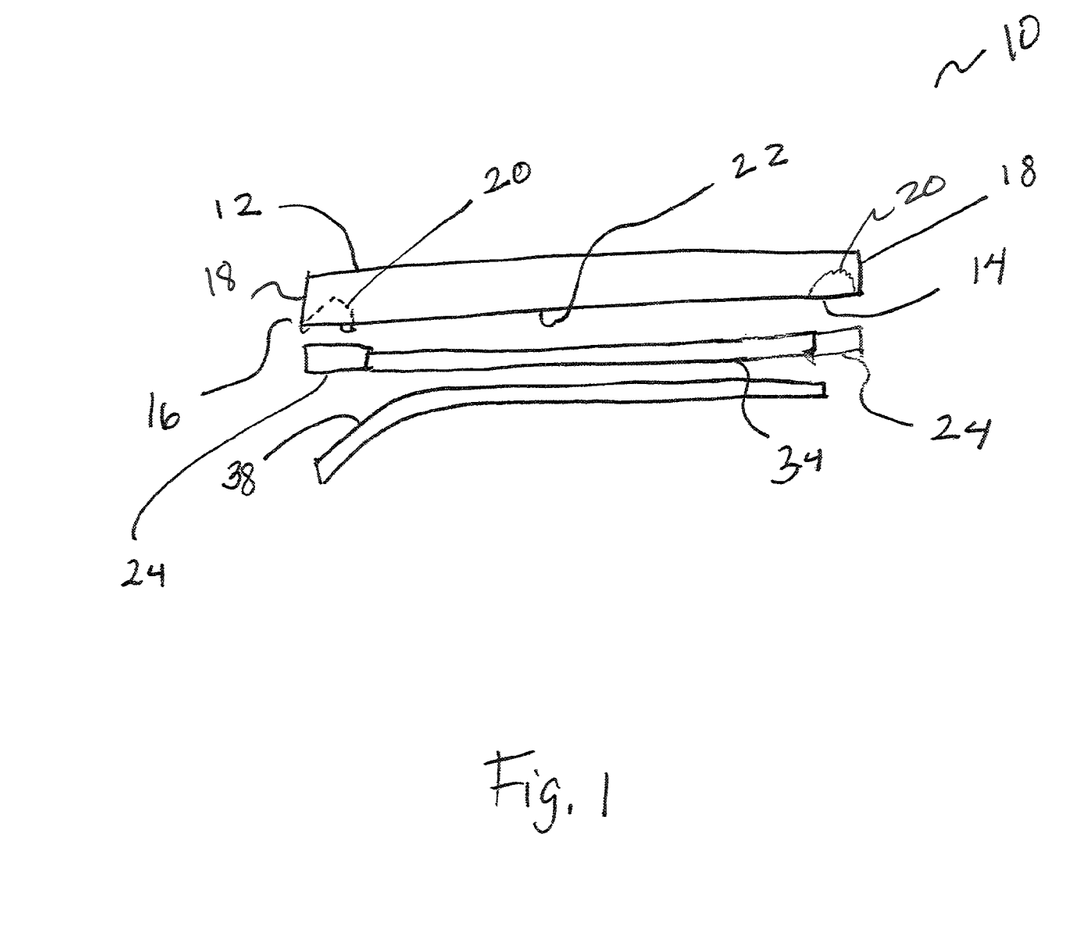
FIG. 1 is a schematic cross-sectional exploded view of an embodiment of the underlayment of the invention.
Figure 2:
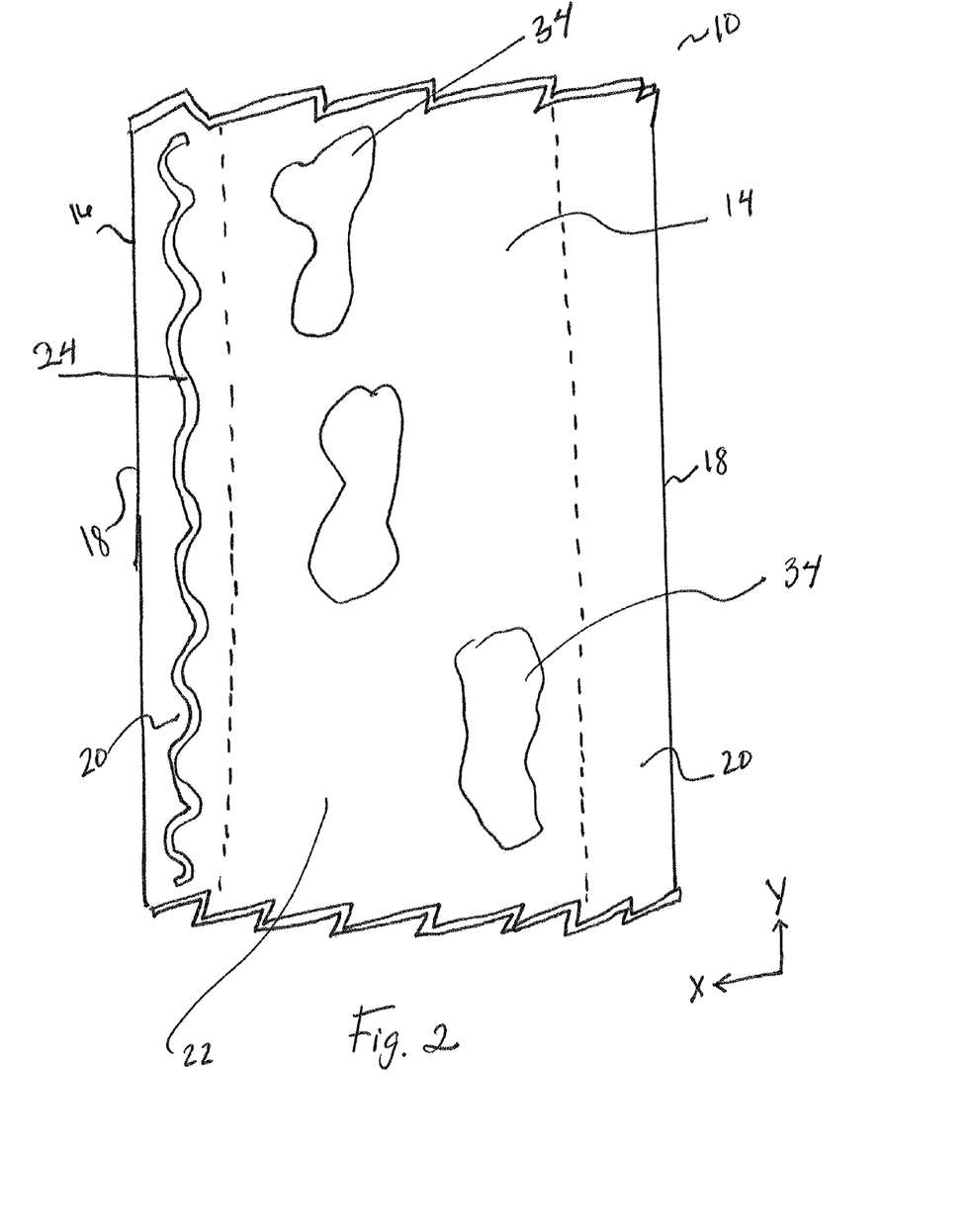
FIG. 2 is a schematic plan view of the bottom surface of a section of an embodiment of the invention.
Figure 3:
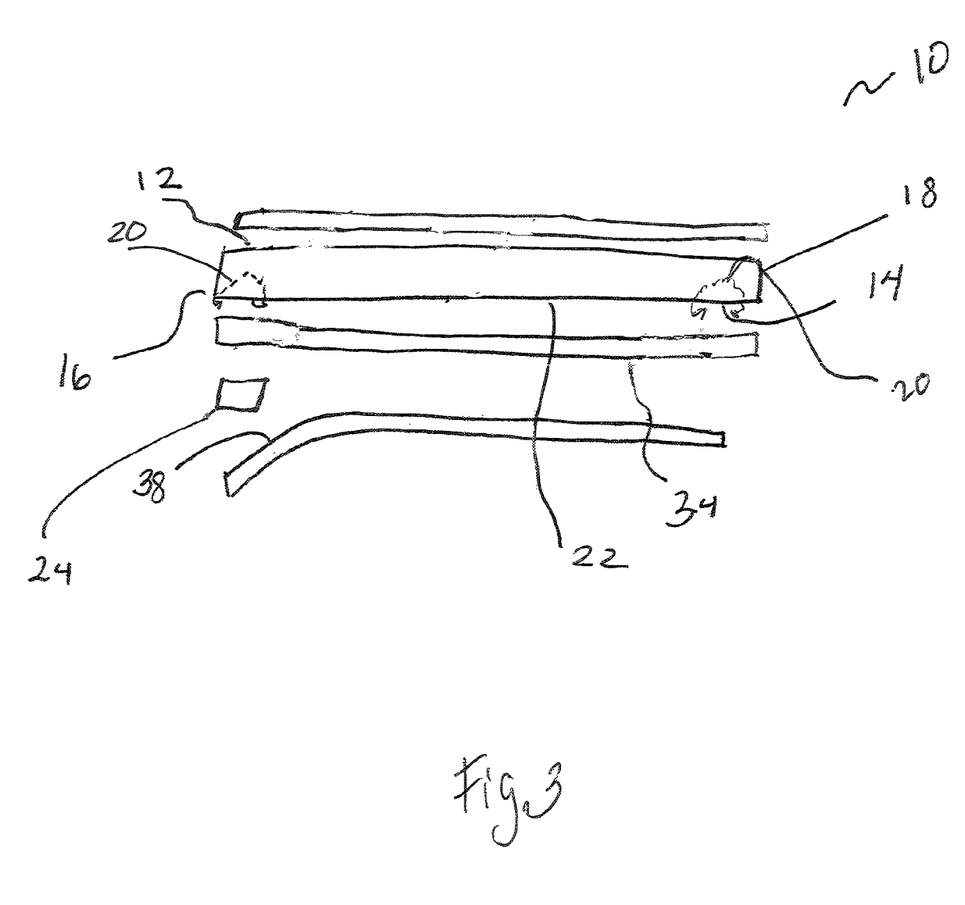
FIG. 3 is a schematic cross-sectional exploded view of an embodiment of the invention.
Figure 4:
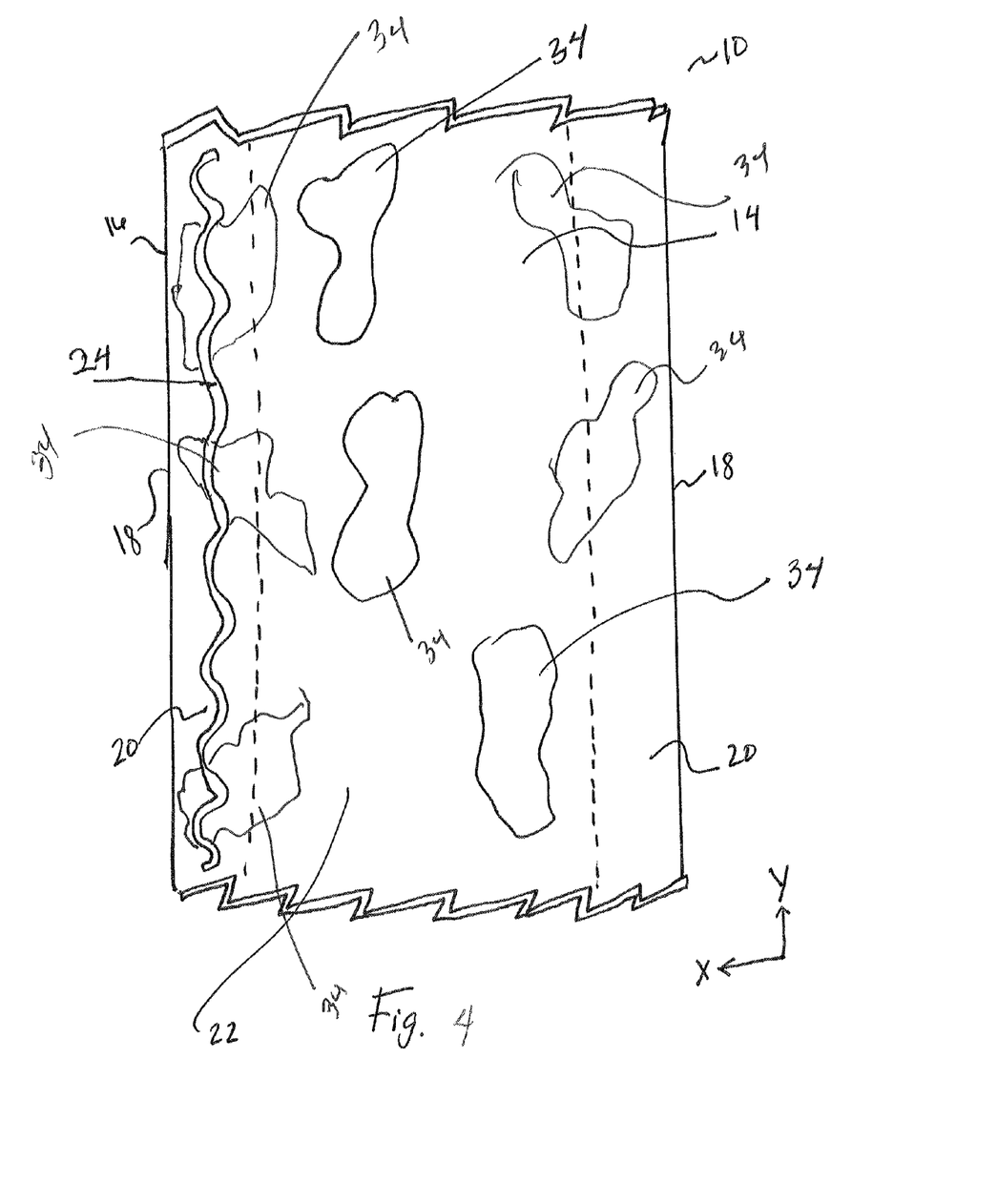
FIG. 4 is a schematic plan view of the bottom surface of a section of an embodiment of the invention.
Figure 5:
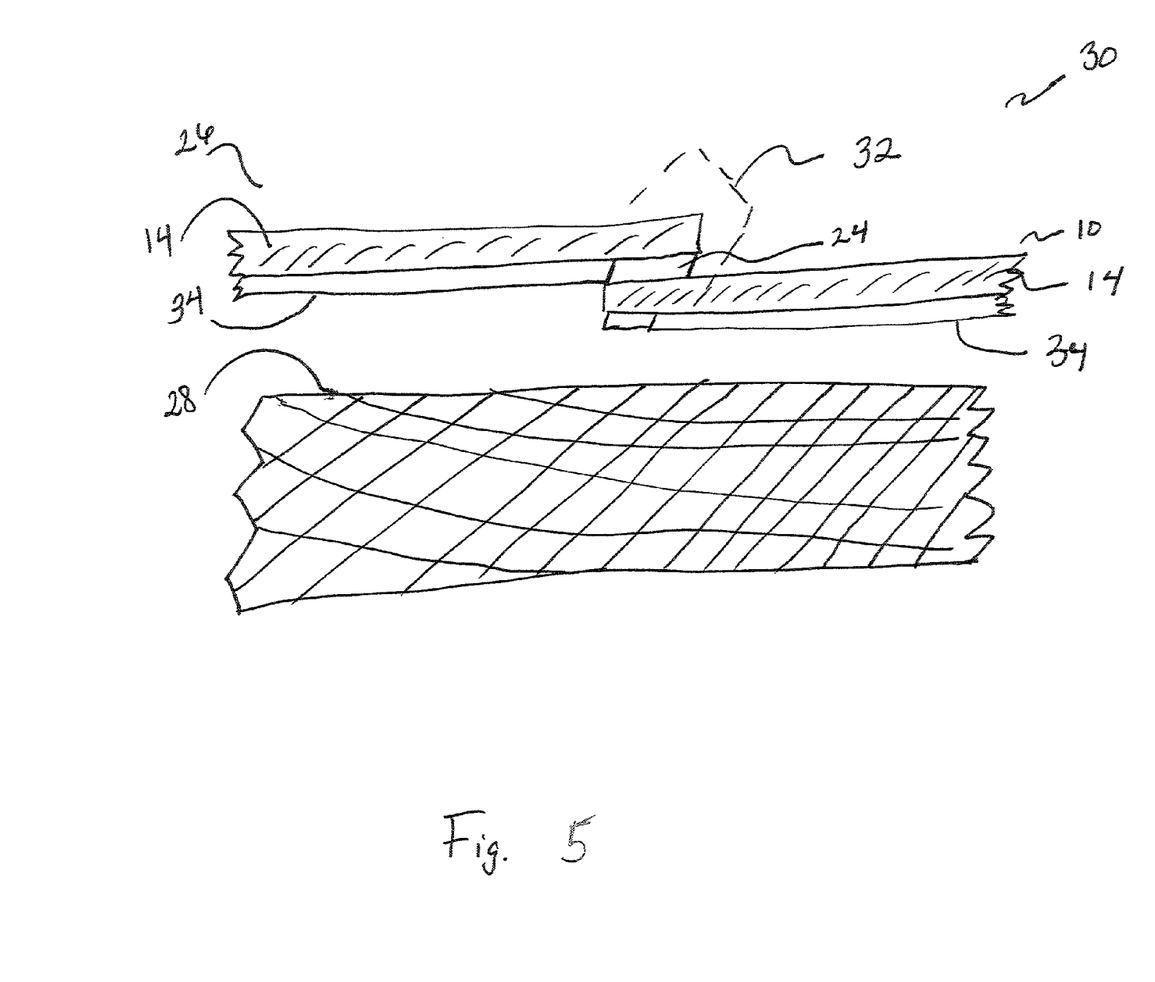
FIG. 5 is a cross sectional, partial exploded view of the building assembly of the invention, where the underlayment applied is the embodiment of FIG. 1.

In an alternative embodiment, both the interior portion 22 of the bottom surface 14 of the lamina 16 and the selvage portion of 20 of the bottom surface 14 of the lamina 16 bear the self-adhesive layer 34 (See FIGS. 3 and 4). In such embodiments, it may be preferable that the self-adhesive layer 34 is laid down prior to the application of the bonding composition 24 a shown in, e.g., FIG. 3.

FIG. 4, for example, shows an underlayment 10 where the self-adhesive layer 34 is applied discontinuously over the interior portion 22 and the selvage portion 20 of the bottom surface 14. The bonding composition 24 is applied over top of the self-adhesive layer 34.

If desired one may prepare the lamina so that other layers/coatings are interspersed in the "sandwich" that forms the underlayments as described herein.

In an embodiment, the underlayment sheet of the invention is prepared at a factory facility. The release film, is preferably a flexible material (to permit rolling) and made of a material that to which the self adhesive layer and/or the bonding composition will not permanently adhere. Suitable materials include, without limitation, polypropylene and polyethylene, kraft paper, waxed paper, wax- or silicone-treated textile, and the like.

The release film is detachably applied to the coated bottom of the lamina, so that the underlayment can be packaged on rolls without sticking to itself, which permits simpler shipping and installment. In an embodiment of the invention, the release film 36 has an upper face 38 that is detachably attached to the self-adhesive layer 34 and/or the bonding composition 24.

In some embodiments, the upper face 38 may be coated with an anti-sticking composition prior to the application of the upper face 38 to the bottom surface 12. Suitable anti-sticking compositions may include, without limitation, waxes, an oils, a silicone, poly(1,1,2,2-tetrafluoroethylene) an other release polymers.

It may be desirable that the release film has a thickness of about 30 to about 100 microns, with lesser thicknesses potentially being more desirable, as the film would take up less volume when the underlayment sheet is packaged in a roll.

The top surface 12 of the lamina 16 may be unmodified.

In some embodiments, the top surface 12 is coated with the self-adhesive layer as described herein, either continuously or discontinuously, see FIG. 3. Alternatively or additionally, the top surface may carry one or more materials, such as, for example, modified bitumen-based compositions, UV reflecting materials, a UV absorbing materials, a fire retardant, such as, for example, compositions containing calcium borate, magnesium borate, antimony tri-oxide, and/or deca bromo diphenyl oxide, a texturizing material, etc. In an embodiment, the top surface is designed to provide traction and/or slip resistance to the installer, who may walk on the top surface as he or she is installing the underlayment. The traction or slip resistance can be achieved by applying a material to the top surface (such as a curable suspension of grit, or other particles) and/or may be in the form of a texturized surface molded onto the lamina.

If the top surface 12 has an additional layer/treatment add to it as described above, the layer or treatment may be on top of the self-adhesive layer, underneath it, mixed within it, or any combination thereof.

In some embodiments, the finished underlayment sheet will have an overall cross-sectional thickness of about 1 mm, about 2 mm, about 3 mm or about 4 mm. It may be desirable, in some embodiments that the finished underlayment sheet has a moisture vapor permanence of no greater than about 5.7 ng/Pa·S·M, a maximum thermal stability of about 3 mm, and a tear resistance of at least 89 N (both longitudinal and transverse).

The underlayment of the invention may be prepared by methods known or to be developed in the art. By way of example, it may be prepared by saturating the lamina in an asphalt compound, removing excess by squeezing with rollers (this step being optional). Subsequently, the bonding composition and the self adhesive layer are applied using roll coaters. Any desired surfacing components may be added at this point. The underlayment is then cooled for packaging.

One or both of the self adhesive layer and/or the bonding composition may be applied by any applicator or method, for example, a brash, extrusion, dispensing heads, slot die, sponge, textile application, foam applicator, and the like.

Also included within the scope of the invention is a building assembly that includes any of the building underlayment sheets described herein, and a building surface. Building surfaces may include, without limitation, roofs (steep pitched or flat), exterior walls, interior walls, doors, etc. The surfaces may be bare wood or plywood, or may be surfaces to which other treatments have been previously applied, including other fabrics, barrier or wraps.

The building assembly of the invention my further include a second underlayment sheet. In the assembly, a selvage portion of the first sheet (bearing the bonding composition) is overlapped with the top surface of the second underlayment sheet, such that the overlapping sheets form a full lap joint that is substantially resistant to rain, snow, and ice.

All permutations of the elements described above, including the presence or absence of an element, are contemplated in the embodiments of the final building underlayment sheets, the building assembl(ies), and the methods of the invention.

EXAMPLES

Example 1—Preparation of Exemplary Bonding Composition

Various bonding compositions for embodiments of the invention are prepared as set forth below. The ingredients of Table 1 are combined together in the order listed. First, the asphalt and the poly(styrene-butadiene-styrene) are combined by mixing under heat (about 180° C.) and high shear to disperse the polymer. Subsequently the remaining ingredients are added under low shear and the mixture is mixed until the ingredients are uniformly incorporated.

TABLE 1

| Ingredient | Amount (% by weight of Total Composition) |
|---|---|
| Asphalt | 40-70 |
| poly(styrene-butadiene-styrene) | 2-15 |
| Ground Tire Rubber | 0.5-7 |
| NP 25* | 0.5-7 |
| Piccotac** | 0-15% |
| Paraffinic Oil | 0-10% |
| Calcium carbonate | 0-35 |
| | 100 |

*NP 25 is a proprietary low molecular weight hydrocarbon resin commercially available from Neville Chemical Company of Pittsburgh, PA.
**Piccotoac ™ is a proprietary low molecular weight aliphatic hydrocarbon resin commercially available from Eastman Chemical Company, Kingsport, Tennessee.

The resultant bonding compositions are applied to the selvage portion of laminas as described in Example 3, herein.

Example 2—Preparation of Exemplary Composition for Self Adhesive Layer

A composition for the self adhesive layer for an embodiment of the invention was prepared as set forth below. The ingredients of Table 2 are combined together in the order listed. First, the asphalt and the poly(styrene-butadiene-styrene) are combined by mixing under heat (about 180° C.) and high shear to disperse the polymer. Subsequently, the remaining ingredients are added under low shear and the mixture is mixed until the ingredients are uniformly incorporated.

TABLE 2

| Ingredient | Amount (% by weight of Total Composition) |
|---|---|
| Asphalt | 50-80 |
| poly(styrene-butadiene-styrene) | 3-15 |
| NP 25 | 0-15 |
| Piccotac ™ | 0-10 |
| limestone | 0-25 |
| | 100 |

The resultant composition is applied to the interior portion of laminas as described in Example 3, herein.

Example 3—Preparation of an Embodiment of the Underlayment of the Invention

A lamina consisting of a polyester sheet having a thickness of 0.8 mm, a length of 20 meters and a width of about 1 meter is obtained. On the bottom surface of the lamina, a selvage portion is defined as extending 3 inches from the longitudinal and from the horizontal distal edges of the lamina. To the selvage portion is applied the bonding composition of Example 1 by roller. The remaining surface of the bottom surface, the interior portion, is continuously coated with the composition of Example 2 using a calendared roll coater.

Subsequently, to the bottom layer (interior and selvage portions both), a release film is applied. The release film is a thin polyethylene film bearing on its upper face (the face applied to the bottom layer) a pre-treatment of a silicone anti-sticking composition. The release film has length and width dimensions approximately the same as the dimensions of the underlayment sheet.

The resultant underlayment sheet is wound on a hypothetical x axis providing a roll that is approximately 1 meter tall and which can be packaged for transport to a building site.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A building underlayment sheet comprising: an underlayment lamina having a top surface and a bottom surface, wherein the bottom surface includes an interior portion and a selvage portion that extends from the interior portion of the bottom surface to a terminal distal edge of the sheet, wherein the interior portion of the bottom surface bears a self adhesive layer, and the selvage portion of the bottom surface bears a bonding composition that is capable of bonding to a top surface of a second underlayment lamina to form a full lap joint.

2. The sheet of claim 1, further comprising a second self adhesive layer that is on the top surface of the lamina.

3. The sheet of claim 1, wherein each of the selvage portion and the interior portion of the bottom surfaces bears a self adhesive layer and the bonding composition is laid over the self adhesive layer of the selvage portion.

4. The sheet of claim 1 that is an underlayment for at least one building component selected from tile, shingles, siding, clapboard, brick, stone, wood shakes, stucco, 20 metal panels, wherein the building component is applied to the top surface.

5. The sheet of claim 1, wherein the lamina is composed of a material selected from a non-woven material, a woven material, a saturated felt, a porous material, a non-porous material, and a polymer.

6. The sheet of claim 1, wherein the lamina is composed of a material selected from polyester, fiberglass, and combinations of the same.

7. The sheet of claim 1, wherein the selvage portion extends about 1 to about 5 inches from the terminal distal edge.

8. The sheet of claim 1, wherein the selvage portion extends a distance selected from about 3 inches and about 4 inches from the terminal distal edge.

9. The sheet of claim 1, wherein the self adhesive layer comprises an asphalt, polymer, and a tackifier.

10. The sheet of claim 5, wherein the self adhesive layer further comprises a filler.

11. The sheet of claim 5, wherein the self adhesive layer further comprises a filler that is selected from limestone, chalk, talc, carbon fibers, carbon black, carbon nanotubes, laponite, silica, ash, china clay, smectite and mixtures thereof.

12. The sheet of claim 1, wherein the bonding composition is distributed discontinuously on the bottom surface of the sheet.

13. The sheet of claim 1, wherein the bonding composition comprises asphalt, poly(styrene-butadiene-styrene), ground tire rubber (GTR), and tackifier.

14. The sheet of claim 13, wherein the bonding composition further comprises a filler.

15. The sheet of claim 13 wherein the bonding composition further comprises a filler selected from is selected from limestone, talc, carbon fibers, carbon black, carbon nanotubes, laponite, silica, ash, china clay, smectite and mixtures thereof.

16. The sheet of claim 1, wherein the top surface bears a layer comprising, an asphalt, a modified asphalt, a polymer, and mixtures thereof.

17. The sheet of claim 1, wherein the top surface bears a layer comprising a UV reflecting material, a UV absorbing material, a fire retardant, a texturizing material, and mixtures thereof.

18. The sheet of claim 1, further comprising a first release film having an upper face that is detachably applied to at least one of the bottom surface or the top surface of the lamina.

19. The sheet of claim 18, wherein the first release film is a flexible material.

20. The sheet of claim 18, wherein the release first film is composed of a material 25 selected from polypropylene and polyethylene.

21. The sheet of claim 18 wherein the upper face of the release film is coated with an anti-sticking composition prior to the application of the upper face to the bottom surface of the lamina.

22. The sheet of claim 21, wherein the anti-sticking composition is selected from a wax, an oil, a silicone, and poly(l, 1,2,2-tetrafluoroethylene).

23. A building assembly comprising: a. a building surface; and b. the building underlayment sheet of claim 1, wherein the underlayment sheet is adhered to the building surface.

24. A building underlayment sheet comprising: an underlayment lamina having a top surface and a bottom surface, wherein the bottom surface includes an interior portion and a selvage portion that extends from the interior portion of the bottom surface to a terminal distal edge of the sheet, wherein each of the interior portion of the bottom surface and the selvage portion of the bottom surface bears a self adhesive layer, and the selvage portion of the bottom surface bears a bonding composition that is laid over the self adhesive layer and which is capable of bonding to a top surface of a second underlayment lamina to form a full lap joint.

25. A building underlayment sheet comprising: an underlayment lamina having a top surface and a bottom surface, wherein the bottom surface includes an interior portion and a selvage portion that extends from the interior portion of the bottom surface to a terminal distal edge of the sheet, wherein each of the interior portion of the bottom surface and the selvage portion of the bottom surface bears a first self adhesive layer, the top surfaces bears a second self adhesive layer; and the selvage portion of the bottom surface bears a bonding composition that is laid over the self adhesive layer and which is capable of bonding to a top surface of a second underlayment lamina to form a full lap joint.

26. A building underlayment sheet comprising: an underlayment lamina having a top surface and a bottom surface, wherein the bottom surface includes an interior portion and a selvage portion that extends from the interior portion of the bottom surface to a terminal distal edge of the sheet, wherein the interior portion of the bottom surface bears a self adhesive layer comprising an asphalt, poly(styrene-butadiene-styrene)(SBS), and a tackifier, and the selvage portion of the bottom surface bears a bonding composition comprising asphalt, poly(styrene-butadiene-styrene), ground tire rubber (GTR), and tackifier.

* * * * *